(12) United States Patent
Ishiguro et al.

(10) Patent No.: US 7,772,744 B2
(45) Date of Patent: Aug. 10, 2010

(54) ULTRASONIC ACTUATOR WHICH ACTS ON A ROTOR TO ROTATE THE ROTOR

(75) Inventors: Minoru Ishiguro, Saitama (JP);
Shinichi Yamamoto, Saitama (JP);
Manabu Aoyagi, Muroran (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/224,986

(22) PCT Filed: Feb. 28, 2007

(86) PCT No.: PCT/JP2007/053808
§ 371 (c)(1),
(2), (4) Date: Sep. 11, 2008

(87) PCT Pub. No.: WO2007/105489
PCT Pub. Date: Sep. 20, 2007

(65) Prior Publication Data
US 2009/0072666 A1     Mar. 19, 2009

(30) Foreign Application Priority Data
Mar. 13, 2006 (JP) .............................. 2006-067669

(51) Int. Cl.
*H01L 41/08* (2006.01)
(52) U.S. Cl. .............................. 310/323.09; 310/323.01
(58) Field of Classification Search ................. 310/323, 310/328
See application file for complete search history.

(56) References Cited

U.S. PATENT DOCUMENTS

| | | | | |
|---|---|---|---|---|
| 5,146,129 A | * | 9/1992 | Tamura et al. | 310/323.16 |
| 5,204,577 A | * | 4/1993 | Watanabe et al. | 310/323.08 |
| 5,561,337 A | * | 10/1996 | Toda | 310/323.02 |
| 5,712,524 A | * | 1/1998 | Suga | 310/328 |
| 5,828,157 A | * | 10/1998 | Miki et al. | 310/328 |
| 6,307,299 B1 | * | 10/2001 | Suzuki et al. | 310/312 |
| 6,690,101 B2 | * | 2/2004 | Magnussen et al. | 310/328 |
| 6,885,615 B1 | | 4/2005 | Miyazawa et al. | |
| 2004/0156274 A1 | | 8/2004 | Miyazawa et al. | |

FOREIGN PATENT DOCUMENTS

| | | |
|---|---|---|
| EP | 1 075 079 A1 | 2/2001 |
| JP | 5-344765 A | 12/1993 |
| JP | 2000-333480 A | 11/2000 |
| JP | 2003-199371 A | 7/2003 |
| JP | 2004-294580 A | 10/2004 |
| JP | 2004-294759 A | 10/2004 |
| JP | 2005-218179 A | 8/2005 |
| WO | WO-00/38309 A1 | 6/2000 |

* cited by examiner

*Primary Examiner*—J. SanMartin
(74) *Attorney, Agent, or Firm*—Birch, Stewart, Kolasch & Birch, LLP

(57) ABSTRACT

It is an object to provide a small ultrasonic actuator whose voltage control is easy. The ultrasonic actuator acts on a rotatable rotor to rotate the rotor, the ultrasonic actuator includes: a plate vibrator having one end which contacts the rotor, a corner portion bent at a midpoint in the vibrator, and the other end which is fixed; and a piezoelectric device which contacts a part of the vibrator between the one end and the corner portion, and transmits a vibration to the vibrator by vibrating in response to application of an alternating voltage between one of electrodes provided respectively on both surfaces or the plate vibrator serving as the one of the electrodes and the other of the electrodes.

8 Claims, 10 Drawing Sheets

ULTRASONIC ACTUATOR WHICH ACTS ON A ROTOR TO ROTATE THE ROTOR

TECHNICAL FIELD

The present invention relates to an ultrasonic actuator which acts on a rotatable rotor to rotate the rotor.

BACKGROUND ART

Recent small apparatuses such as a portable telephone have a built-in image taking unit for shooting an image of a subject. As a user of such a small apparatus need not carry a digital camera or a video camera in order to take a photograph, he/she can always take a photograph easily. Also, such a small apparatus generally is provided with a data communications capability using radio or infrared rays. Thus, such a small apparatus has another advantage that a user can send image data to another portable telephone or a personal computer immediately after shooting.

However, the image taking unit mounted in the small apparatus such as a portable telephone is so small that the unit has constraints on size of a charge-coupled device (CCD) and a lens as well as on space for accommodating them in the unit. As a result, the small image taking unit has a difficulty in exhibiting a photographic function and an image quality equal to those of a digital camera. Therefore, a use of the image taking unit is limited in photography in which a high image quality is not required, for example, a photograph substituted for a memorandum and a photograph for an image to be displayed on a stand-by screen of a portable telephone.

In this respect, the recent development of a small CCD with many pixels and a small lens corresponding to the type of CCD has improved an image quality of a photograph taken by using the small apparatus. The remaining problem is to improve the shooting function. In order to address this problem, it is desired to provide zoom and autofocus functions in the small apparatus which are ordinarily mounted in a digital camera.

In general, these functions are realized by moving a lens in the direction along the optical axis using rotation of a motor. In many cases, an electro-magnetic motor in which a rotor is rotated by a magnetic field is used as a motor to move a lens. But, an electro-magnetic motor consumes a lot of electricity and is rather large as a driving source. Accordingly, mounting an electromagnetic motor on the small apparatus results in significant increase in size and weight of the small apparatus. Moreover, mounting an electromagnetic motor requires an amount of electricity large enough to drive the electromagnetic motor in addition to the electricity used for other general photographic functions. Therefore, it is difficult to mount zoom and autofocus functions by using an electromagnetic motor on a portable telephone and the like, which is required to be small and lightweight.

Regarding this point, a photographic apparatus in which an actuator making use of piezoelectricity is used instead of an electromagnetic motor in order to move a lens is disclosed in Patent Documents 1 and 2. Also, in Patent Documents 3 and 4, a basic structure of an actuator making use of piezoelectricity is disclosed.

FIG. 1 is a schematic diagram of an ultrasonic actuator making use of piezoelectricity, and FIG. 2 is an explanatory diagram of a principle on which the ultrasonic actuator operates.

As shown in FIG. 1, the ultrasonic actuator 10 has a piezoelectric device 11, an elastic vibrating object 12, a rotor 13, a holding member 14, a spring 15, and a press plate 16. The piezoelectric device 11 vibrates in response to application of a voltage and the elastic vibrating object 12 is distorted by the vibration of the piezoelectric device 11. The rotor 13 rotates due to the stress of the distortion of the elastic vibrating object 12. The holding member 14 has a role of holding the piezoelectric device 11 and the elastic vibrating object 12. The spring 15 serves for pushing the elastic vibrating object 12 toward the rotor 13, while the press plate 16 serves for pressing the spring 15 toward the elastic vibrating object 12.

As shown in FIG. 2, the elastic vibrating object 12 is sandwiched between the two piezoelectric devices 11a, 11b. When an alternating voltage is applied to each of the two piezoelectric devices 11a, 11b with the same phase, these piezoelectric devices 11a, 11b expands and contracts in the same direction. The expansion and contraction cause distortion of the elastic vibrating object 12, whose tip is pressed toward the rotor 13. The tip of the elastic vibrating object 12 is driven in such a way that it moves depicting an ellipse. By the movement of the tip of the elastic vibrating object 12, the rotor 13 rotates in the direction of an arrow A in FIG. 2.

In an image taking unit provided with an ultrasonic actuator making use of piezoelectricity such as the above one, it is possible to drive a lens with less electricity than an electromagnetic motor. Moreover, it is also possible to realize a lightweight image taking unit which can move a lens quietly.

[Patent Document 1] Japanese Patent Application Publication No. 2004-294759

[Patent Document 2] Japanese Patent Application Publication No. 2004-294580

[Patent Document 3] Japanese Patent Application Publication No. 2005-218179

[Patent Document 4] Japanese Patent Application Publication No. 2003-199371

Meanwhile, as forms of distortion of an elastic vibrating object, there are known three kinds of vibration, that is, a longitudinal vibration originated from expansion and contraction of the elastic vibrating object, a bending vibration originated from waving of the elastic vibrating object, and a combination vibration made of the two vibrations combined together. In order to realize fast rotation of a rotor, it is desirable to cause the elastic vibrating object to have a combination vibration. However, according to the techniques disclosed in Patent Documents 3 and 4, alternating voltages need to be applied to each of plural piezoelectric devices with different phases to cause the combination vibration of an elastic vibrating object. Therefore, these techniques have such a problem that the voltage control becomes complex.

In addition, a conventional ultrasonic actuator making use of piezoelectricity requires a pressing structure having elements such as the spring 15 and the press plate 16 in order to press the elastic vibrating object 12 toward the rotor 13, besides the holding member 14 that holds the elastic vibrating object 12. Although the additional pressing structure is not directly related to the distortion of the elastic vibrating object 12, it requires space equal to that required by other parts of the ultrasonic actuator, thereby preventing a reduction in size of an ultrasonic actuator.

Accordingly, in order to mount an ultrasonic actuator making use of piezoelectricity in the above-described image taking unit for a portable telephone and the like, the ultrasonic actuator is required to be smaller in size and the voltage control is required to be further simplified.

The above problems are not limited to image taking units, but they occur in any field in which an ultrasonic actuator driven by application of a voltage is used.

In view of the above circumstances, it is an object of the present invention to provide a small ultrasonic actuator with easy voltage control.

DISCLOSURE OF THE INVENTION

An ultrasonic actuator achieving the above object is an ultrasonic actuator which acts on a rotatable rotor to rotate the rotor, the ultrasonic actuator including:

a plate vibrator having one end which contacts the rotor, a corner portion bent in the middle of the vibrator, and the other end which is fixed; and a piezoelectric device which contacts a part of the vibrator between the one end and the corner portion, and transmits a vibration to the vibrator by vibrating in response to application of an alternating voltage.

According to the ultrasonic actuator of the present invention, the piezoelectric device is held by the fixed end (the other end) of the plate vibrator. The end (the one end) of the plate vibrator which contacts the rotor is pressed against the rotor due to elasticity of the part of the plate vibrator between the fixed end (the other end) and the corner portion. Thus, it is unnecessary to employ a pressing mechanism composed of member such as the holding member 14, the spring 15, and the press plate 16 shown in FIG. 1. As a result, size of the entire ultrasonic actuator is reduced in the present invention. Also, according to the ultrasonic actuator of the present invention, when an alternating voltage is applied to the piezoelectric device, the vibrator distorts in the direction corresponding to the phase of the alternating voltage. At this time, the direction of a part of the distortion is changed at the corner portion. As a result, plural parts of distortion whose directions are different are combined together and transmitted to the rotor. Therefore, since it is possible to generate the above-mentioned combination vibration only by applying a single-phase alternating voltage, the voltage control is simplified.

In ultrasonic actuator of the present invention, preferably, the piezoelectric devices are plural and sandwich the part of the vibrator between the one end and the corner portion.

Providing a plurality of piezoelectric devices which sandwich the vibrator makes it possible to cause a large distortion of the vibrator so that the rotor can rotate fast, while avoiding an increase in size of the ultrasonic actuator.

In the ultrasonic actuator according to the present invention, preferably, the vibrator is a metallic plate which serves as one of electrodes for each of the plural piezoelectric devices.

According to this preferable ultrasonic actuator, the size of the ultrasonic actuator can reduced because the vibrator also serves as an electrode for applying a voltage to the vibrator.

In the ultrasonic actuator according to the present invention, preferably, a part of the vibrator which is near the one end is formed narrower than remaining parts of the vibrator.

It is possible to transmit the distortion of the vibrator efficiently to the rotor by forming a part of the vibrator at the end contacting the rotor to be narrow, so that the rotor can be rotated reliably.

In the ultrasonic actuator according to the present invention, preferably, upon receipt of a transmitted vibration of the piezoelectric device generated in response to application of an alternating voltage of a different frequency, the vibrator vibrates to rotate the rotor in a different direction.

By changing the frequency of an alternating voltage applied to the piezoelectric device, the component ratio and the phase relationship between the longitudinal vibration and the bending vibration generated in the vibrator are changed, so that the direction of the combined forces applied from the vibrator to the rotor is changed. This makes it possible to control the rotation direction of the rotor.

In the ultrasonic actuator according to the present invention, preferably, the vibrator vibrates to rotate the rotor in different directions depending on switching of the frequency of an alternating voltage applied to the piezoelectric device between a resonance frequency of longitudinal vibration of the vibrator and a resonance frequency of bending vibration of the vibrator.

When an alternating voltage of the resonance frequency of longitudinal vibration is applied to the piezoelectric device, the vibrator greatly vibrates in the longitudinal direction while vibrating in the bending direction. Meanwhile, when an alternating voltage of the resonance frequency of bending vibration is applied to the piezoelectric device, the vibrator greatly vibrates in the bending direction while vibrating in the longitudinal direction. In this way, in the preferable ultrasonic actuator according to the present invention, the direction of the force acting on the rotor can be changed while keeping the vibration of the vibrator large. Accordingly, it is possible to readily change the rotation direction of the rotor while rotating the rotor reliably and efficiently.

In the ultrasonic actuator according to the present invention, preferably, the vibrator vibrates to rotate the rotor in different directions, depending on switching of the frequency of an alternating voltage applied to the piezoelectric device between a first frequency, which is closer to a resonance frequency of bending vibration of the vibrator, among resonance frequencies of longitudinal vibration of the vibrator and a second frequency, which is closer to a resonance frequency of longitudinal vibration of the vibrator, among resonance frequencies of bending vibration of the vibrator.

In either of application of an alternating voltage of the first resonance frequency to the piezoelectric device and application of an alternating voltage of the second resonance frequency to the piezoelectric device, combination vibration occurs in the vibrator. However, these cases are opposite to each other in terms of the component ratio and phase relationship between longitudinal vibration and bending vibration when the longitudinal vibration and the bending vibration are combined together. Accordingly, the directions of the combined forces acting on the rotor in these cases are opposite to each other. Therefore, by switching an alternating voltage applied to the piezoelectric device between the first frequency and the second frequency, it is possible to efficiently rotate the rotor while reliably and readily changing the rotation direction of the rotor.

According to the present invention, it is possible to provide a small ultrasonic actuator whose voltage control is easy.

BEST MODE FOR CARRYING OUT THE INVENTION

First of all, the above-described problems in a conventional ultrasonic actuator making use of piezoelectricity will be analyzed in detail.

Figure 1:
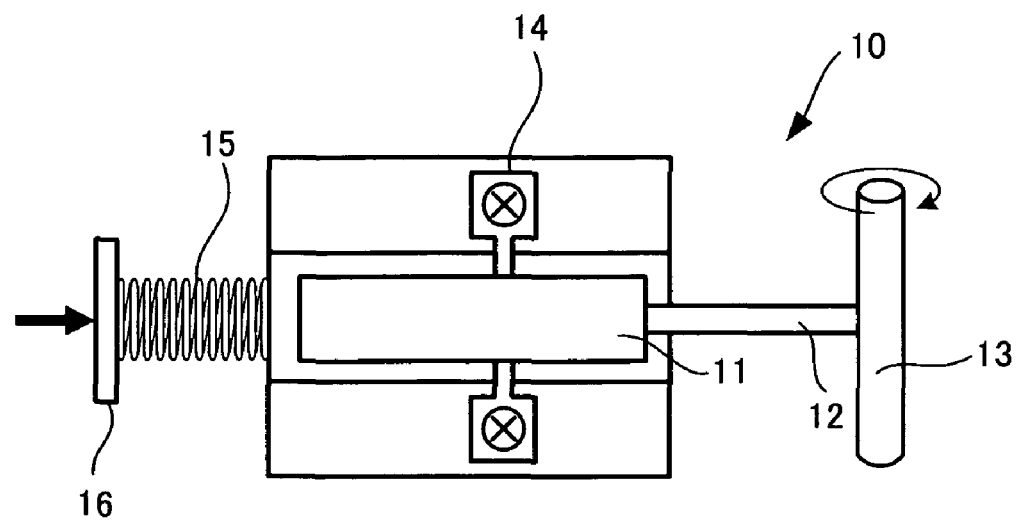
FIG. 1 is a schematic diagram of an ultrasonic actuator.
Figure 2:
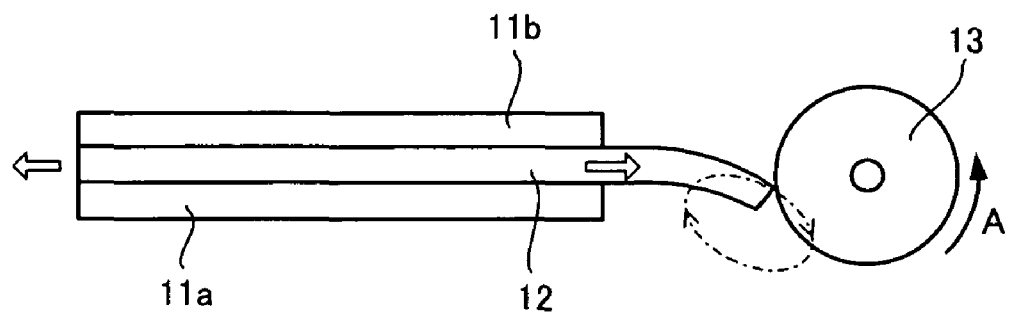
FIG. 2 is an explanatory diagram of a principle on which the ultrasonic actuator operates.
Figure 3:
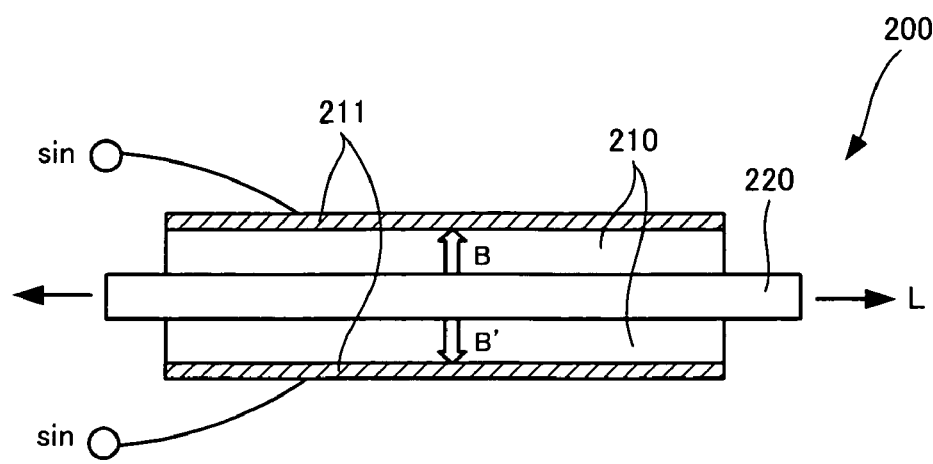
FIG. 3 is an explanatory diagram of a principle on which a conventional ultrasonic actuator operates.

FIG. 3 is an explanatory diagram of a principle on which a conventional ultrasonic actuator operates.

As shown in FIG. 3, the ultrasonic actuator 200 basically includes a metallic vibration plate 220, two piezoelectric devices 210 sandwiching the vibration plate 220, and electrodes 211 to apply a voltage to the piezoelectric devices 210. The piezoelectric devices 210 are polarized in the directions of an arrows B and B', respectively, along thickness of the piezoelectric devices 210 which is perpendicular to the vibration plate 220. The vibration plate 220 serves as a vibrating object which is distorted by vibration of the piezoelectric devices. In addition, the vibration plate 220 also serves as a counter electrode with respect to the electrodes 211. Besides various components shown in FIG. 3, there are: a holding member which holds the piezoelectric devices 210 and the vibration plate 220, an additional pressing structure for pressing the vibration plate 220 toward a driven object, and the like. As a whole, the ultrasonic actuator 200 is larger than an ultrasonic actuator of the embodiment of the present invention which will be described later.

Figure 4A:
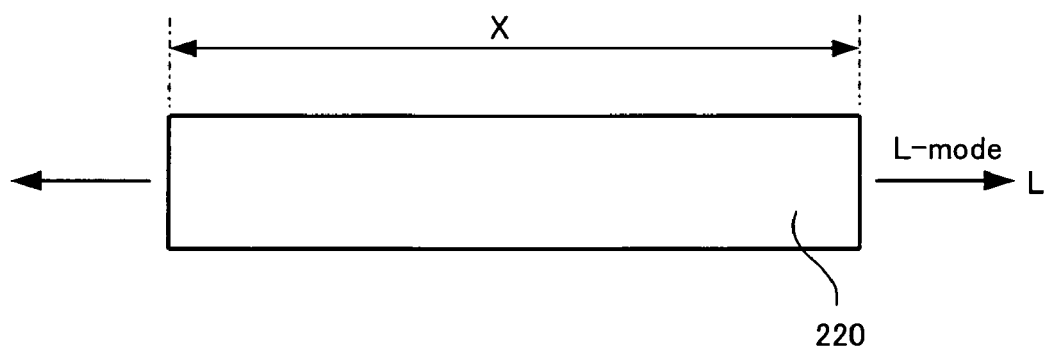
FIGS. 4A and 4B are diagrams to show the direction of distortion of the vibration plate.
Figure 4B:
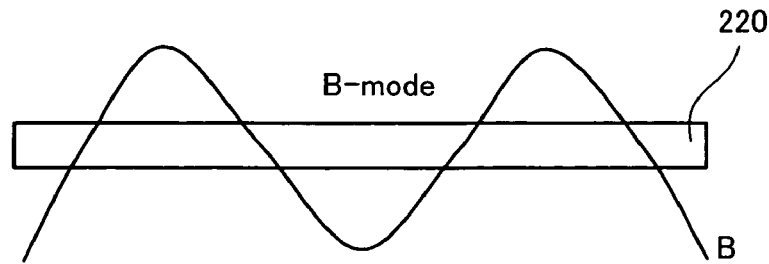
Figure 5:
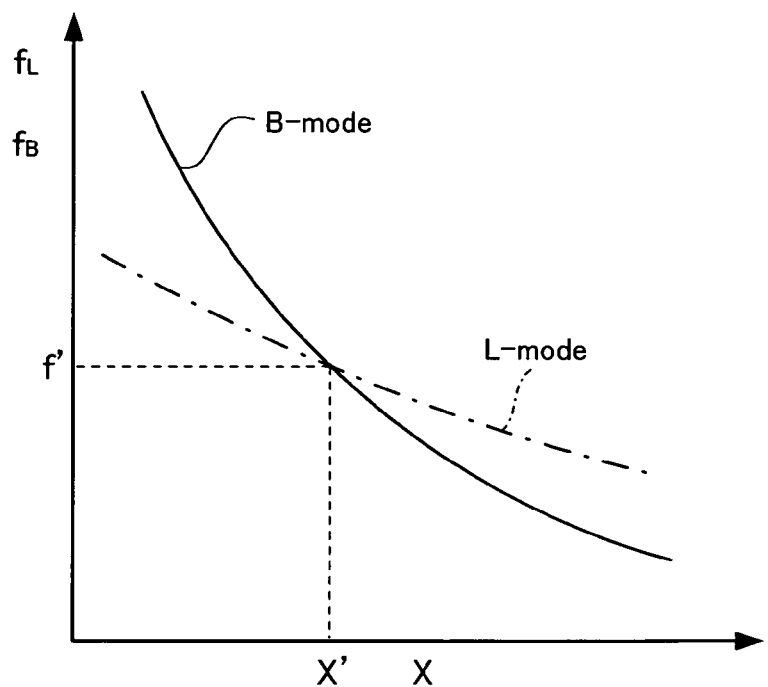
FIG. 5 is a graph showing resonance frequencies of the vibration plate.

FIG. 4A and FIG. 4B are diagrams showing the direction of distortion of the vibration plate 220, and FIG. 5 shows a graph showing resonance frequencies of the vibration plate 220.

When voltages are applied to the piezoelectric devices 210, there occurs distortion of the vibration plate 220 which depends on a phase of the applied voltage. One distortion is a longitudinal vibration (L-mode) in the direction of the contraction and expansion of the vibration plate 220, as shown in FIG. 4A. Another distortion is a bending vibration (B-mode) in the direction of bending of the vibration plate 220, as shown in FIG. 4B.

In FIG. 5, a horizontal axis represents the length of the vibration plate 220, and a vertical axis represents resonance frequency of the vibration plate 220. The resonance frequency of the vibration plate 220 varies depending on the length of the vibration plate 220 as well as on the vibration direction, that is, a longitudinal vibration and a bending vibration (L-mode and B-mode). In FIG. 5, a resonance frequency ($f_L$) of a longitudinal vibration becomes the same as a resonance frequency ($f_B$) of a bending vibration at a length X' of the vibration plate 220. That is, two modes cross each other (degenerated) at a length X'.

It is preferable to give a vibration whose frequency is a resonance frequency f' under the condition that a resonance frequency ($f_L$) of a longitudinal vibration and a resonance frequency ($f_B$) of a bending vibration is close to the resonance frequency f' in order to generate both a longitudinal vibration and a bending vibration. By doing so, it is possible to drive the ultrasonic actuator 200 shown in FIG. 3 efficiently. But, even if a vibration whose frequency is a resonance frequency f' is given to the vibration plate 220 from each of the two piezoelectric devices with the same phase, there occurs cancellation of distortion in the bending direction of the vibration plate 220 caused by vibrations of the two piezoelectric devices. This is due to the fact that a configuration of the ultrasonic actuator 200 is symmetric. As a result, the vibration plate 220 can be distorted only in the direction of its contraction and expansion. Therefore, there is a problem that complex voltage control is required in order to distort the vibration plate 220 both in the bending direction and in the contraction and expansion direction, because it is necessary to control individually the magnitude and phase of each of voltages applied to the two piezoelectric devices 210.

The present invention is based on the above detailed analysis.

An embodiment of the present invention will be described below with reference to the drawings.

Figure 6:
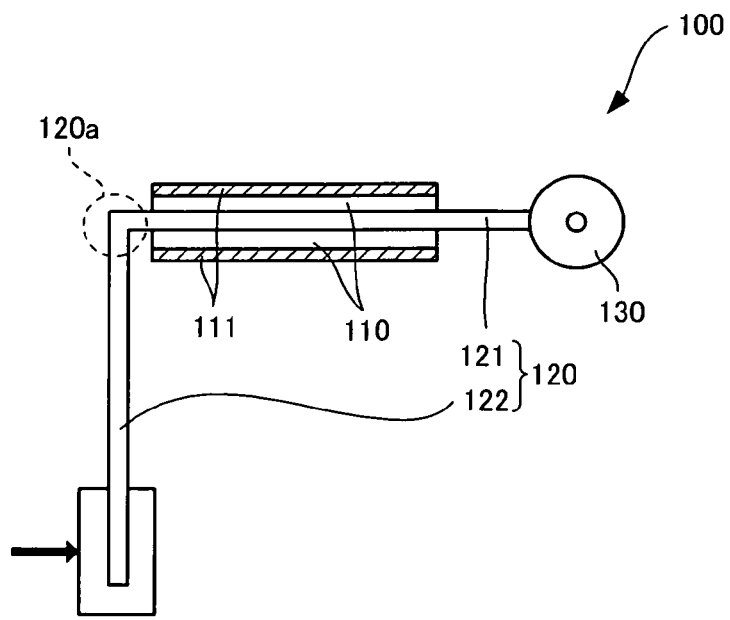
FIG. 6 is a schematic diagram showing a structure of an ultrasonic actuator of an embodiment of the present invention.

FIG. 6 is a schematic diagram showing a structure of an ultrasonic actuator of an embodiment of the present invention.

As shown in FIG. 6, the ultrasonic actuator 100 has two piezoelectric devices 110, electrodes 111, a vibration plate 120, and a rotor 130. The rotor 130 is driven to rotate and the piezoelectric devices 110 vibrate in response to application of an alternating voltage which is applied via the electrodes 111. The vibration plate 120 bends at a corner portion 120a like a character of L, and has an upper leg 121 and a lower leg 122. The upper leg 121 contacts the rotor 130 and the lower leg 122 has a fixed end. The vibration plate 120 corresponds to an example of the vibrator according to the present invention, and the rotor 130 corresponds to an example of the rotor according to the present invention. Also, the piezoelectric device 110 corresponds to an example of the piezoelectric device according to the present invention.

Figure 7:
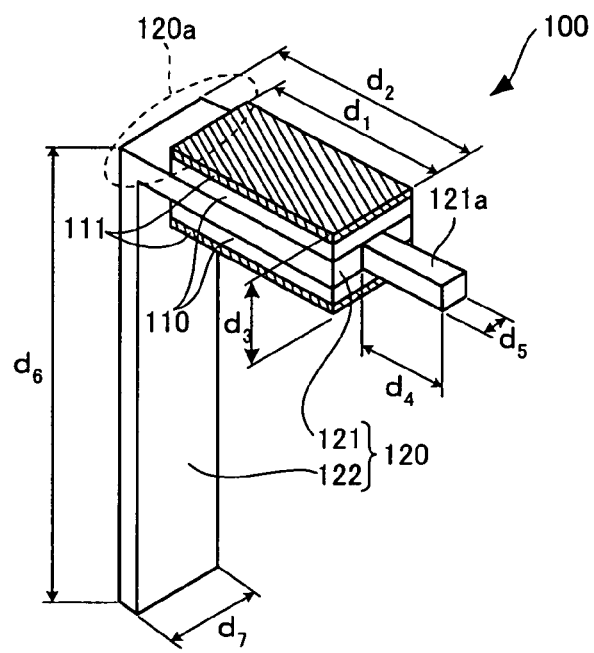
FIG. 7 is an enlarged diagram of a vibration plate and piezoelectric devices.
Figure 8:
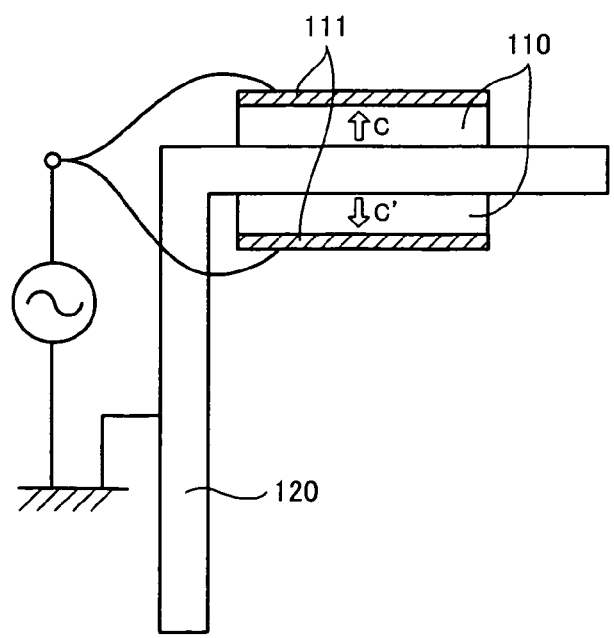
FIG. 8 is a diagram showing directions in which the piezoelectric devices are polarized.

FIG. 7 is an enlarged diagram of the vibration plate 120 and the piezoelectric devices 110, and FIG. 8 is a diagram showing directions in which the piezoelectric devices are polarized.

In the embodiment, the vibration plate 120 is made of stainless steel, for example, SUS304. On the other hand, the piezoelectric devices 110 are made of piezoelectric ceramics, for example, PZT. But, materials of the vibration plate 120 and the piezoelectric devices 110 are not limited to stainless steel and piezoelectric ceramics, respectively.

The vibration plate 120 is formed in such that the contact portion 121a which contacts the rotor 130 has a narrow width. Meanwhile, the two piezoelectric devices 110 are disposed in such that they sandwich the upper leg 121 of the vibration plate 120. The metallic vibration plate 120 serves as a vibrating object which is distorted by vibration of the piezoelectric devices 110. In addition, the metallic vibration plate 120 also serves as an electrode opposed to each of a pair of electrodes 111 respectively provided on the two piezoelectric devices 110. It is possible to realize a small ultrasonic actuator in the embodiment because the vibration plate 120 serves as a vibrating object as well as an electrode.

Now, the sizes of the vibration plate 120 and the piezoelectric device 110 will be described. In the example shown in FIG. 7, the length $d_1$ of the piezoelectric device 110 is 3.0 mm, and the length $d_2$ of the upper leg 121 of the vibration plate 120 except the contact portion 121a is 3.4 mm. Further, the thickness of the piezoelectric device 110 and that of the vibration plate 120 are both 0.2 mm, and the total thickness $d_3$ of the two piezoelectric devices 110 and the vibration plate 120 combined together is 0.6 mm. The length $d_4$ of the contact portion 121a of the vibration plate 120 is 1.4 mm, and the width $d_5$ of the contact portion 121a is 0.5 mm. The length $d_6$ of the lower leg 122 of the vibration plate 120 is 7.0 mm, and its width $d_7$ is 1.3 mm.

Further, as shown in FIG. 8, the two piezoelectric devices 110 are polarized in the directions of an arrows C, C' respectively along thickness of the piezoelectric devices 110. Two alternating voltages whose phases, magnitude and frequencies are the same are applied to the two piezoelectric devices 110 respectively.

Figure 9:
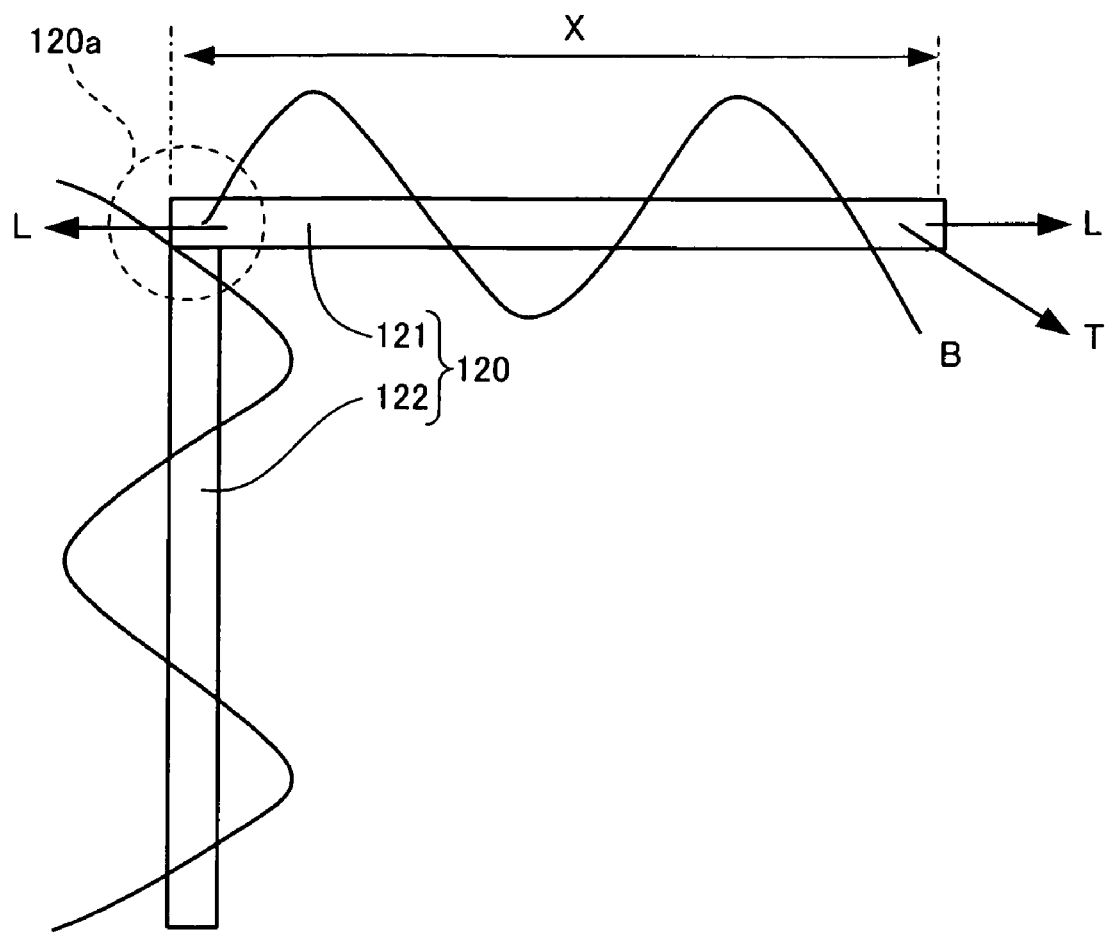
FIG. 9 is a diagram to show the directions of the distortion occurred in the vibration plate.
Figure 10:
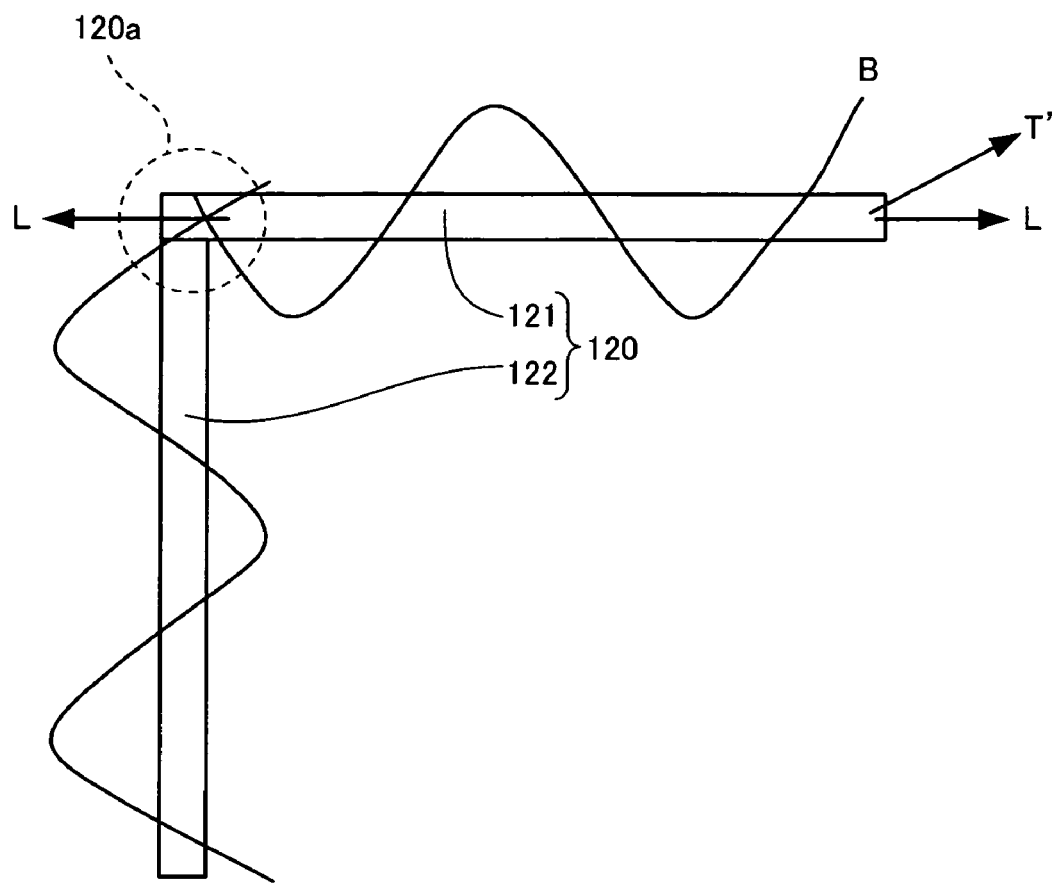
FIG. 10 is a diagram to show the directions of the distortion occurred in the vibration plate.

FIG. 9 and FIG. 10 are diagrams to show the directions of the displacement occurred in the vibration plate 220.

When alternating voltages are applied to the two piezoelectric devices 110, the piezoelectric devices 110 vibrate and there occurs distortion of the upper leg 121 of the vibration plate 120. The upper leg 121 of the vibration plate 120 is pressed against the rotor 130 by elasticity of the lower leg 122, ensuring transmission of the distortion occurred in the vibration plate 120 to the rotor 130. Thanks to the shape of the vibration plate 120 bending like a character of L, there is no need to provided the ultrasonic actuator 200 with additional members such as a holding member which holds the piezoelectric devices 110 and a pressing structure which presses the vibration plate 120 against the rotor 130. Consequently, the size of the ultrasonic actuator 200 can be greatly reduced by decreasing the number of components and the manufacturing cost.

The direction of a part of distortion occurred in the upper leg 121 is changed at the corner portion 120a. As a result, there occur plural parts of distortion in the vibration plate 120 whose directions are different. These parts of distortion are combined together and transmitted to the rotor 130. Here, the orders of vibration modes of the vibration plate 120 depicted in FIG. 9 and FIG. 10 are only examples and can be adjusted by changing length of the vibration plate 120.

Figure 11:
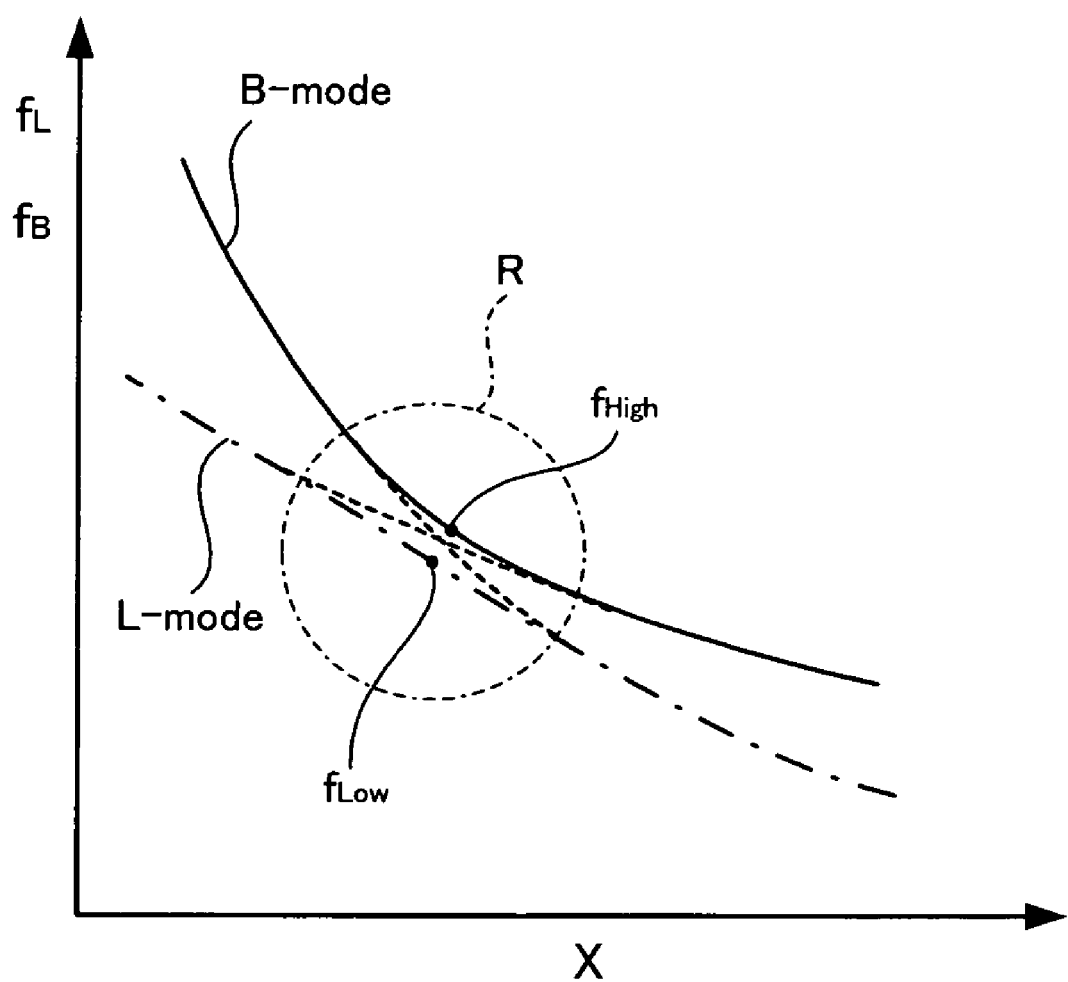
FIG. 11 is a graph showing resonance frequencies of the vibration plate.

FIG. 11 shows a graph showing resonance frequencies of the vibration plate 120.

In FIG. 11, a horizontal axis represents the length X of the upper leg 121 of the vibration plate 120, and a vertical axis represents the resonance frequency of the vibration plate 120.

Compared with the conventional ultrasonic actuator shown in FIG. 3, there is no symmetry of a configuration in the ultrasonic actuator 100 of the embodiment because the vibration plate 120 bends like a character of L. Therefore, when longitudinal vibrations are generated, a part of the longitudinal vibrations is changed into a bending vibration. Conversely, when bending vibrations are generated, a part of the bending vibrations is changed into a longitudinal vibration. As a result, there always exist two kinds of vibration intermingled together.

As shown in FIG. 11, it never occurs that a resonance frequency of longitudinal vibrations (L-mode) agrees with that of bending vibrations (B-mode) in the ultrasonic actuator 100 of the embodiment. But, there is a region R in which the resonance frequencies become close to each other. In the region R, there is the closest resonance frequency $f_{Low}$ on the line of longitudinal vibrations which is the closest point to the line of bending vibrations. Also in the region R, on the line of bending vibrations, there is the closest resonance frequency $f_{High}$ which is the closest point to the line of longitudinal vibrations. The closest resonance frequency $f_{Low}$ is one example of the first resonance frequency according to the present invention, while the closest resonance frequency $f_{High}$ is one example of the second resonance frequency according to the present invention.

For example, when each of the two piezoelectric devices 110 receives application of an alternating voltage with the closest resonance frequency $f_{Low}$ on the line of longitudinal vibrations (L-mode) shown in FIG. 11, the vibration plate 120 is distorted mainly in the direction of contraction and expansion. By this distortion, a longitudinal vibration (L-mode) is generated and changed into distortion in the bending direction at the corner portion 120a, which generates the bending vibration (B-mode). These longitudinal vibration and bending vibration are combined together at the contact portion 121a. As a result, the rotor 130 is rotated by a resultant force T caused by contraction and expansion of the vibration plate 120, and bending of the vibration plate 120 itself.

On the other hand, when each of the two piezoelectric devices 110 receives application of an alternating voltage with the closest resonance frequency $f_{High}$ on the line of bending vibrations (B-mode) shown in FIG. 11, the vibration plate 120 is distorted mainly in the bending direction. By this distortion, a bending vibration (B-mode) is generated and changed into distortion in the direction of contraction and expansion at the corner portion 120a, which generates the longitudinal vibration (L-mode). These longitudinal vibration and bending vibration are combined together at the contact portion 121a. As a result, the rotor 130 is rotated by a resultant force T' whose direction of the vertical component of force is opposite to that shown in FIG. 9.

Figure 12:
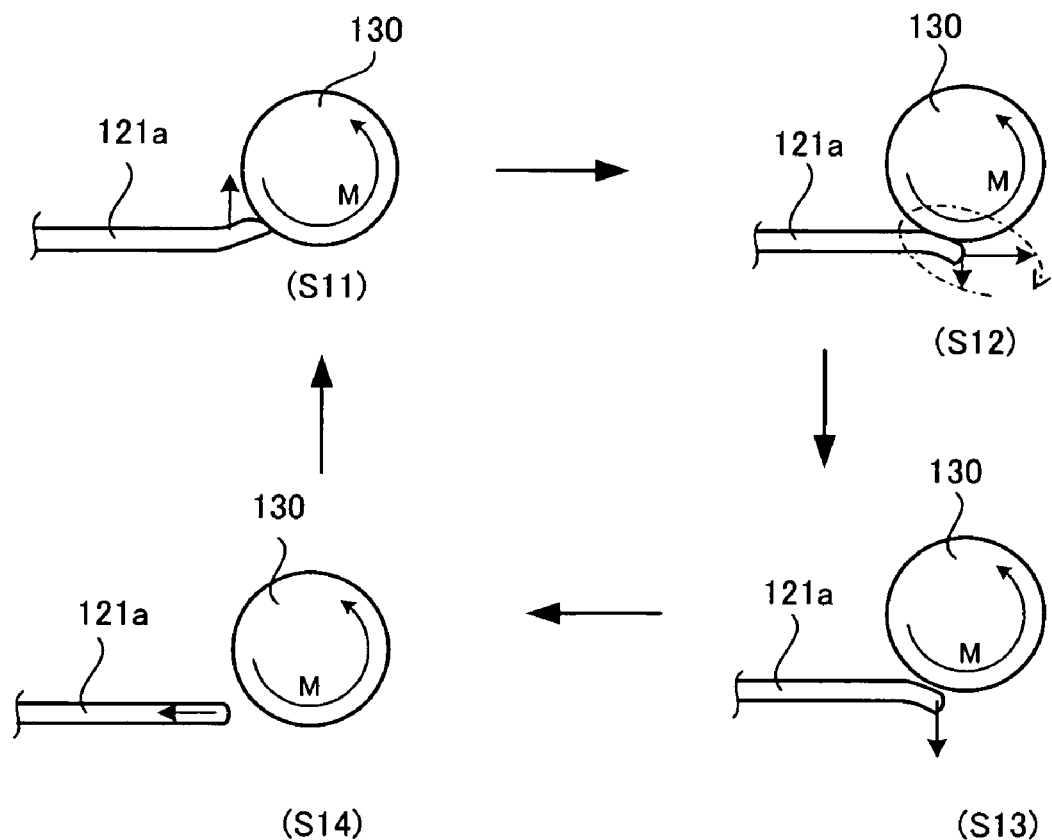
FIG. 12 is a diagram to explain a principle on which the rotor is rotated in the normal direction.

FIG. 12 is a diagram to explain a principle on which the rotor is rotated in the normal direction.

For example, when an alternating voltage with the closest resonance frequency $f_{Low}$ is applied to each of the two piezoelectric devices 110 in order to vibrate the piezoelectric devices 110, the amplitude of distortion of the vibration plate 120 gradually becomes larger. When displacement of bending of the vibration plate 120 becomes close to the maximum in the upper direction, and displacement of contraction and expansion of the vibration plate 120 becomes close to zero, the contact portion 121a of the vibration plate 120 contacts the rotor 130 (step S11 in FIG. 12). In this situation, a velocity of expansion and contraction reaches the maximum in the expansion direction.

Then the vibration plate 120 expands and the contact portion 121a pushes an outer surface of the rotor 130, which gives a torque to the rotor 130. As a result, the rotor 130 rotates in the direction of an arrow M (step S12 in FIG. 12). In this situation, displacement of expansion and contraction becomes close to the maximum and displacement of bending becomes close to zero. At the same time, a velocity in the lower direction reaches the maximum.

After the vibration plate 120 expands at maximum, the vibration plate 120 begins to be displaced in the contraction direction. At this time, the vibration plate 120 is also displaced downward. As a result, the contact portion 121a leaves the rotor 130 (step S13 in FIG. 12). In this situation, displacement of expansion and contraction becomes zero and displacement of bending reaches the maximum in the downward direction. At the same time, a velocity in the contraction direction reaches the maximum.

When the vibration plate 120 contracts as much as possible, the vibration plate 120 contracts and expands in the opposite direction to that of step S11. At this time, the contact portion 121a is away from the rotor 130. As a result, the rotor 130 can continue to rotate by inertia without being prevented from rotating by the contact portion 121a (step S14 in FIG. 12).

The rotor is driven to rotate in the normal direction of an arrow M as described above.

Figure 13:
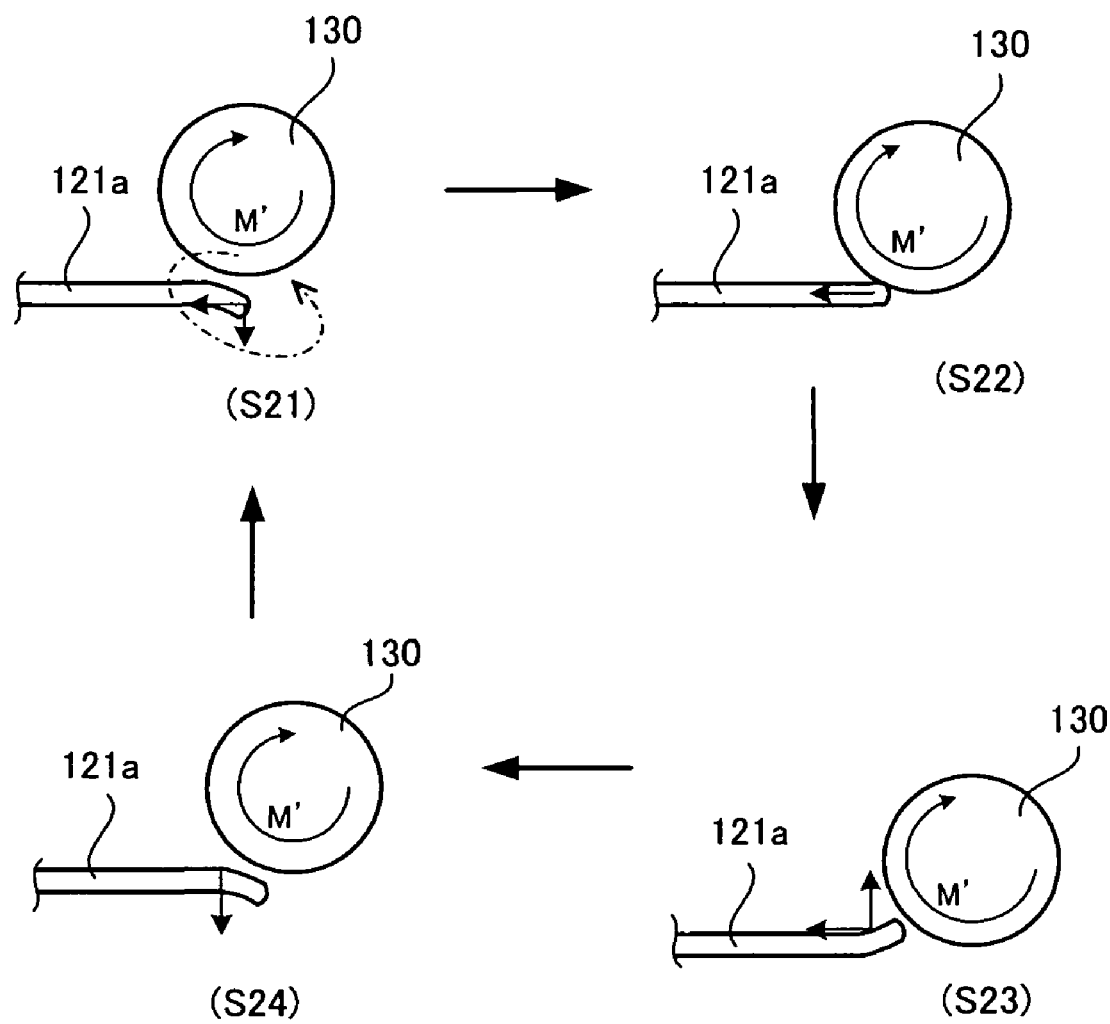
FIG. 13 is a diagram to explain a principle on which the rotor is rotated in the reverse direction.

FIG. 13 is a diagram to explain a principle on which the rotor is rotated in the reverse direction.

In the case of FIG. 13, an alternating voltage with the closest resonance frequency $f_{High}$ is applied in order to vibrate the piezoelectric devices 110. When displacement of expansion and contraction of the vibration plate 120 becomes the maximum in the expansion direction, the contact portion 121a of the vibration plate 120 does not contact with the rotor 130 (step S21 in FIG. 13), contrary to the case of FIG. 12. This is due to displacement of bending.

Then the vibration plate 120 contracts and the contact portion 121a rubs against the outer surface of the rotor 130 with a motion like beckoning. This motion of the contact portion 121a gives a torque to the rotor 130. As a result, the rotor 130 rotates in the direction of an arrow M' (step S22 in FIG. 13). In this situation, both of displacement of expansion and contraction and displacement of bending reach zero. At the same time, a velocity in the contraction direction reaches the maximum.

When displacement of bending reaches the maximum in the upward direction, displacement of expansion and contraction reaches the minimum. At this time, the contact portion 121a leaves the rotor 130 (step S23 in FIG. 13). In this situation, displacement of expansion and contraction reaches the minimum, and displacement of bending reaches the maximum in the upward direction.

When displacement of bending reaches the maximum in the downward direction, displacement of expansion and contraction becomes close to the maximum. At this time, the contact portion 121a is away from the rotor 130. As a result, the rotor 130 can continue to rotate by inertia without being prevented from rotating by the contact portion 121a (step S24 in FIG. 13).

The rotor is driven to rotate in the reverse direction of an arrow M' as described above.

Figure 14:
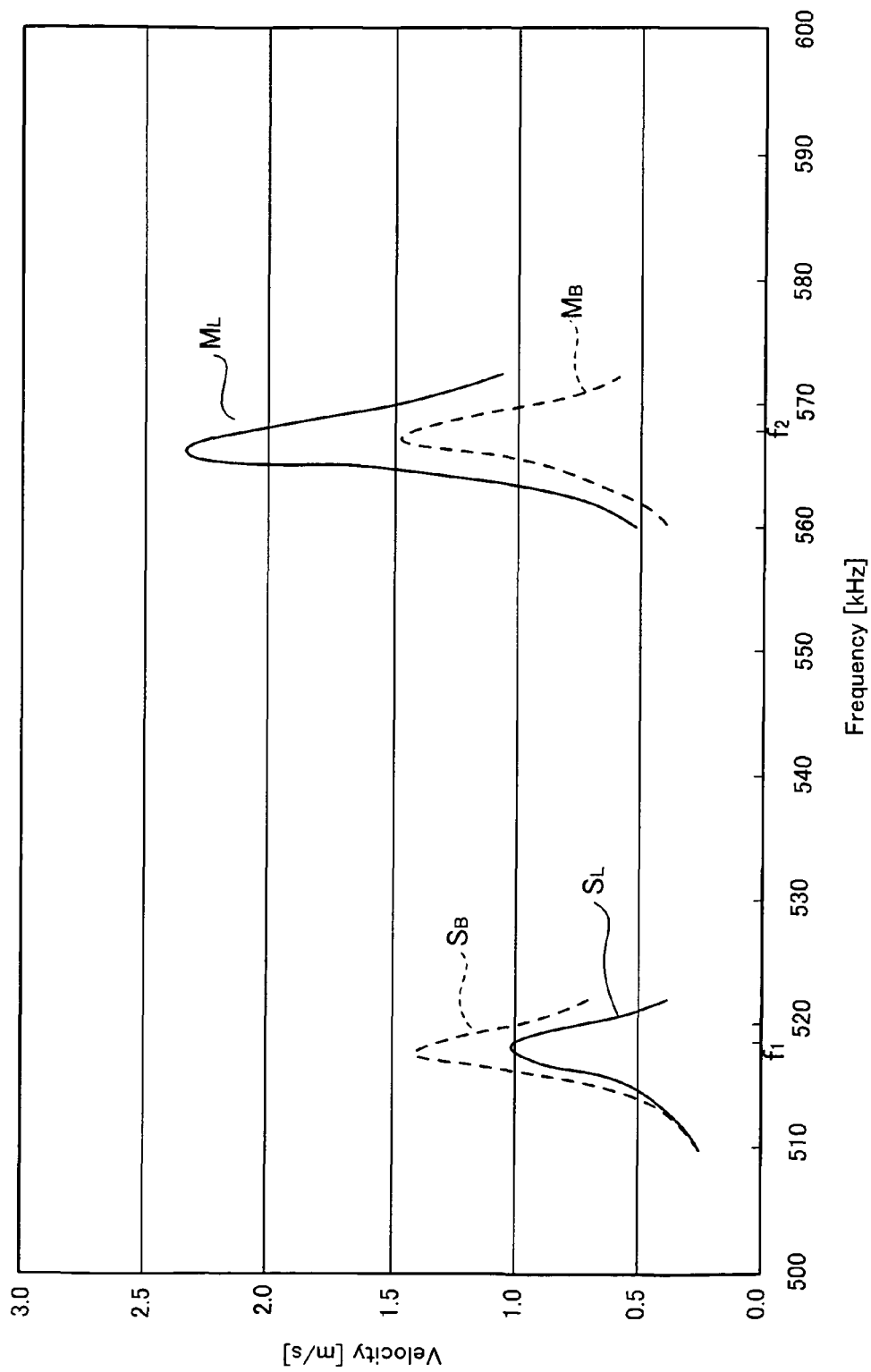
FIG. 14 is a graph showing velocities of the vibration plate in a combination vibration mode.

FIG. 14 is a graph showing velocities of the vibration plate 120 in a combination vibration mode.

In FIG. 14, a horizontal axis represents the frequency of an alternating voltage applied to the piezoelectric device 110, and a vertical axis represents the velocity of the vibration plate 120.

According to results of an analysis using the finite-element method, in the ultrasonic actuator 100 of the embodiment shown in FIG. 7, when the frequency of the alternating voltage is $f_2$ (567.9 kHz), a velocity $M_L$ in the direction of contraction and expansion and a velocity $M_B$ in the bending direction reach the maximums in the direction to rotate the rotor 130 in the normal direction shown in FIG. 12. On the other hand, when a frequency of the alternating voltage is $f_1$ (518.5 kHz), a velocity $S_L$ in the direction of contraction and expansion and a velocity $S_B$ in the bending direction reach the maximums in the direction to rotate the rotor 130 in the reverse direction shown in FIG. 13.

As described above, according to the ultrasonic actuator 100 in the embodiment, only by merely applying the same (in terms of magnitude, phase and frequency) alternating voltage to each of the two piezoelectric devices 110, both of bending vibration and longitudinal vibration of the vibration plate are generated in the vibration plate 120. Therefore, it is possible to rotate the rotor 130 fast by using simple voltage control. In addition, it is also possible to readily change the rotation direction of the rotor 130 and to rotate the rotor 130 efficiently by replacing the alternating voltage applied to the piezoelectric devices 110 with the closest resonance frequencies $f_{High}$ and $f_{Low}$.

In the above description, the ultrasonic actuator is provided with the two piezoelectric devices. But the present invention is not limited to this, the ultrasonic actuator of the present invention may be provided with more than two piezoelectric devices or one piezoelectric device.

Further, in the above description, the ultrasonic actuator is provided with the vibration plate which bends like a character of L. But the present invention is not limited to this, the ultrasonic actuator of the present invention may be provided with a vibrator which has two or more corners.

Furthermore, in the above description, the ultrasonic actuator is provided with the metallic vibration plate which also serves as an electrode of the piezoelectric device. However, the present invention is not limited to this, and the ultrasonic actuator of the present invention may be provided with, for example, a plastic vibrator and besides the plastic vibrator, electrodes to apply a voltage to a piezoelectric device.

The invention claimed is:

1. An ultrasonic actuator which acts on a rotatable rotor to rotate the rotor, the ultrasonic actuator comprising:
   a plate vibrator having one end which contacts the rotor, a corner portion bent in the middle of the vibrator, and an other end which is rigidly fixed so that the other end stays at a predetermined position without moving, wherein the plate vibrator is a single bent plate member; and
   a piezoelectric device which contacts a part of the vibrator between the one end and the corner portion, and vibrates the whole of the vibrator except the other end of the vibrator by vibrating in response to application of an alternating voltage.

2. The ultrasonic actuator according to claim 1, wherein the piezoelectric devices are plural and sandwich the part of the vibrator between the one end and the corner portion.

3. The ultrasonic actuator according to claim 2, wherein the vibrator is a metallic plate which serves as one of electrodes for each of the plural piezoelectric devices.

4. The ultrasonic actuator according to claim 1, wherein a part of the vibrator which is near the one end is formed narrower than remaining parts of the vibrator.

5. The ultrasonic actuator according to claim 1, further comprising:
   a voltage application section that applies an alternating voltage to the piezoelectric device, wherein the voltage application section makes the vibrator vibrate to rotate the rotor in different directions by applying alternating voltages of different frequencies to the piezoelectric device.

6. The ultrasonic actuator according to claim 1, further comprising:
   a voltage application section that applies an alternating voltage to the piezoelectric device, wherein the voltage application section makes the vibrator vibrate to rotate the rotor in different directions by switching the frequency of an alternating voltage applied to the piezoelectric device between a resonance frequency of longitudinal vibration of the vibrator and a resonance frequency of bending vibration of the vibrator.

7. The ultrasonic actuator according to claim 1, further comprising:
   a voltage application section that applies an alternating voltage to the piezoelectric device, wherein the voltage application section makes the vibrator vibrate to rotate the rotor in different directions by switching the frequency of an alternating voltage applied to the piezoelectric device between (1) a first frequency, which is closer to a resonance frequency of bending vibration of the vibrator, among resonance frequencies of longitudinal vibration of the vibrator and
(2) a second frequency, which is closer to a resonance frequency of longitudinal vibration of the vibrator, among resonance frequencies of bending vibration of the vibrator.

8. The ultrasonic actuator according to claim 2, further comprising:
a voltage application section that applies to each of the plural piezoelectric devices an alternating voltage with the same phase.

* * * * *

UNITED STATES PATENT AND TRADEMARK OFFICE
CERTIFICATE OF CORRECTION

PATENT NO.        : 7,772,744 B2
APPLICATION NO.   : 12/224986
DATED             : August 10, 2010
INVENTOR(S)       : Minoru Ishiguro et al.

It is certified that error appears in the above-identified patent and that said Letters Patent is hereby corrected as shown below:

ON THE TITLE PAGE:

At Item (73) Assignee, change:

"(73) Assignee: Fujinon Corporation, Saitama-Shi (JP)"

to

--(73) Assignees: Fujinon Corporation, Saitama-Shi (JP); Muroran Institute of Technology, Muroran-Shi, Hokkaido (JP)--.

Signed and Sealed this
Fourteenth Day of June, 2011

David J. Kappos
*Director of the United States Patent and Trademark Office*